Figure 1:
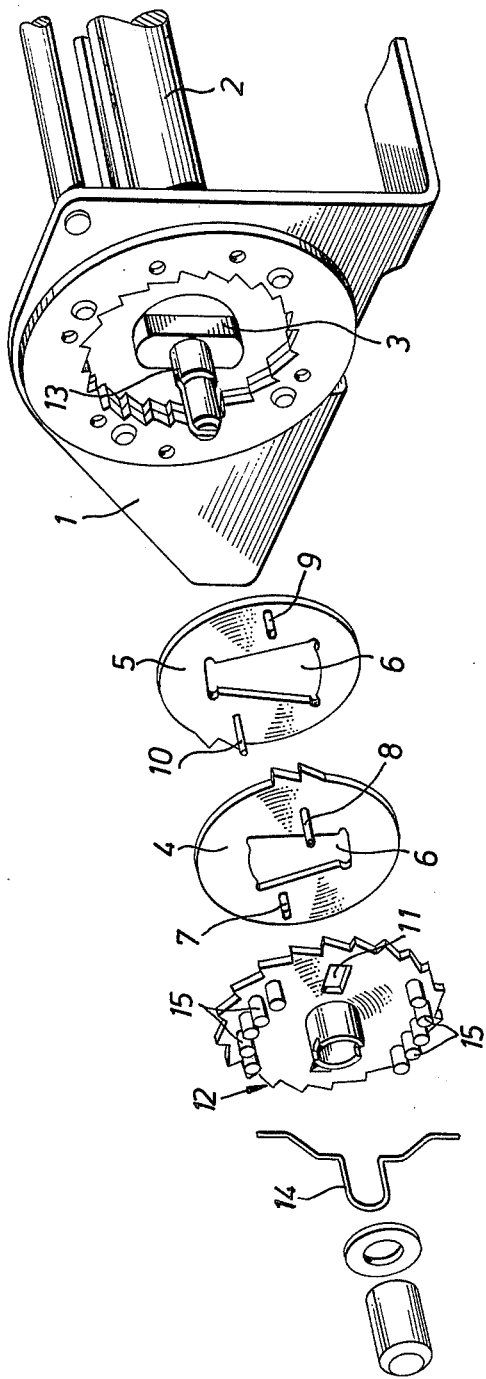

United States Patent [19]
Lindqvist

[11] 3,929,300
[45] Dec. 30, 1975

[54] LOCKING DEVICE

[76] Inventor: Karl Lindqvist, Hagavagen 14, S-171 53 Solna, Sweden

[22] Filed: Nov. 6, 1974

[21] Appl. No.: 521,237

[30] Foreign Application Priority Data
Nov. 12, 1973 Sweden.............................. 7315301

[52] U.S. Cl............................ 242/107.4; 242/107.6
[51] Int. Cl.² ........................................ B65H 75/48
[58] Field of Search.................... 242/107.4, 107.6; 280/150 SB; 297/385, 386, 388; 188/82.4, 82.77

[56] References Cited
UNITED STATES PATENTS

| | | | |
|---|---|---|---|
| 3,421,605 | 1/1969 | Hansen | 188/82.77 |
| 3,568,948 | 3/1971 | Burns | 242/107.4 |
| 3,711,037 | 1/1973 | Jakob | 242/107.4 |
| 3,847,367 | 11/1974 | Fieni | 242/107.4 |

Primary Examiner—Leonard D. Christian
Attorney, Agent, or Firm—Klarquist, Sparkman, Campbell, Leigh, Hall & Whinston

[57] ABSTRACT

A locking device for the rotatable shaft of a reel type safety belt includes a plate mounted on a rectangular portion of the shaft and having a trapezoidal central hole in which the shorter of the parallel sides is slightly longer than the short side of the rectangular shaft portion and the height of the trapezoid is slightly greater than the longer side of the rectangular shaft portion. The plate can thus be rotated around the shorter of the parallel sides in the trapezoid from a normal position in which one of the non-parallel sides abuts one of the longer sides in the rectangular shaft portion to an activated position in which the other non-parallel side abuts the other longer side of the rectangular shaft portion, in which last mentioned position the locking device achieves a locking position.

4 Claims, 3 Drawing Figures

LOCKING DEVICE

The present invention relates to a device for locking rotatable shafts, spindles and the like against rotation, and more particularly to a device for locking the spool of a vehicle safety belt of the roll-up type against rotation when the force acting on said belt in a certain direction reaches a pre-determined limit.

In the case of a vehicle safety belt of the roll-up type it is important that the belt can be withdrawn and placed around a vehicle occupant for which it is intended relatively freely, and that a wearer of said belt is able to move with relatively ease under normal conditions. The belt shall, however, be prevented from further withdrawal when the vehicle is subjected to abnormal conditions, for example, in the event of an accident or in the event of heavy braking or in the event of sharp and abrupt changes in direction of vehicle movement. Attempts have been made previously to fulfill these requirements with respect to the belt by providing the belt reeling device with a mechanism which prevents withdrawal of the belt when the belt withdrawal speed exceeds a determined limit. A disadvantage with known arrangements, however, is that all normal belt withdrawal movements must be effected very slowly, and hence the belt is relatively troublesome to place in position around a vehicle occupant and the movement of the wearer is greatly restricted.

An object of the present invention is to eliminate at least substantially the aforementioned disadvantage and to provide a reel-up type vehicle safety belt which is simple and inexpensive to produce and which ensures satisfactory functioning under all driving conditions.

Accordingly this invention consists in a device for locking a rotatable shaft, spindle or the like, preferably the spool of a reel-type vehicle safety belt, against rotation in a certain direction when the withdrawal force acting on said belt exceeds a pre-determined magnitude in which device a detecting means is arranged to detect the angular acceleration of the shaft and, when said angular acceleration has reached a pre-determined magnitude to move at least one locking means to a locking position to prevent continued rotation of the shaft in said specific direction, characterized in that the detecting means comprises at least one plate which is mounted on a portion of the shaft which is provided with a portion of substantially rectangular cross-sectional shape, and in that the plate is provided with a substantially centrally arranged hole having substantially the form of a trapezoid with the shorter of the parallel sides being insignificantly longer than one side of said substantially rectangular portion and with the height insignificantly greater than the one of the sides of said portion located perpendicularly to the last mentioned side, so that the plate can be rotated around the shorter of the parallel sides in the trapezoid from a normal position in which one of the non-parallel sides abuts one of the sides of the substantially rectangular portion to an activated position in which the other non-parallel side abuts the opposed other side of the substantial rectangular portion, in which last mentioned position the locking means is moved to the locking position.

Figure 2:
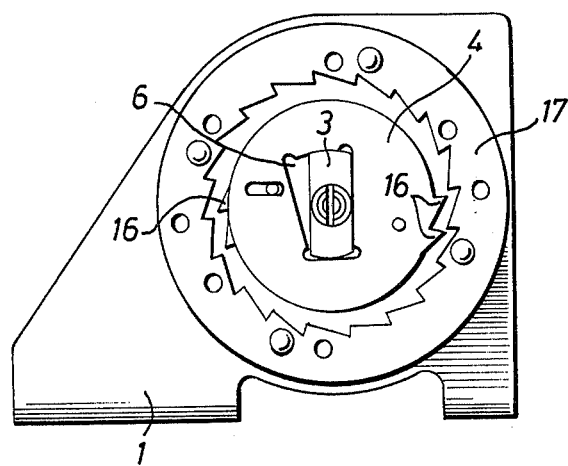
Figure 3:
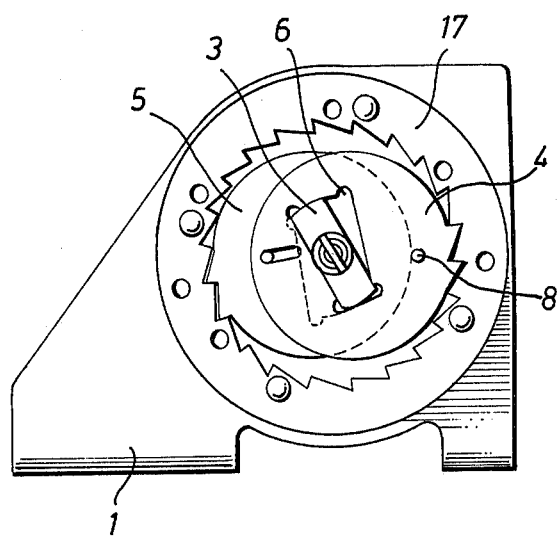

So that the invention will be more readily understood and further features thereof made apparent, the invention will now be described with reference to its application with a vehicle safety harness of the roll-up type illustrated in the accompanying drawings, in which FIG. 1 is an exploded view of the device, FIG. 2 is an end view of the device shown in FIG. 1, as seen from the left in said Figure, with certain parts of the device omitted and with the illustrated parts shown in their rest position and FIG. 3 is a view corresponding to the view of FIG. 2 but with the parts shown in their locking positions.

In the drawings there is shown part of a base member 1 for a vehicle safety harness of the roll-up type. The base member is intended to carry the component parts of the belt reel mechanism, although only those parts necessary to obtain an understanding of the invention are shown in the drawing. The base member 1 is mounted on a shaft 2, which serves as a winding spool or reel for the safety belt and is provided with a slot in which one end of the safety belt can be secured.

One end of the shaft 2 is arranged to be mounted in the end wall of the base member 1 (as shown) and to project therethrough. The portion of the projecting end of the shaft closest to the end wall of the base member 1 is identified by reference 3 and has a substantially rectangular cross-sectional shape. Mounted in side by side relationship on the shaft portion 3 are two substantially circular plates 4 and 5. To this end the plates 4 and 5 are provided with a central hole 6, the hole 6 in each plate being of substantially trapezoidal shape. By trapezoidal is meant a quadilateral having two parallel sides of unequal length. The shorter of the two parallel sides is slightly longer than the short side of the rectangular portion 3 of shaft 2 while the height of the trapezoid is slightly greater than the long side of the rectangular portion 3, whereby the plates 4 and 5 fit on to the portion 3 and can be rotated relative thereto with the centre of rotation located at the shorter of the parallel sides in the hole 6. The magnitude of this rotary movement is limited by the non-parallel sides of the opening 6 which, at the end limits of the rotary movement come into contact with the long sides of the rectangular portion 3.

The hole 6 in plate 5 is rotated through 180° relative to the hole 6 in the plate 4, whereby the plate 4 can be considered to be arranged for movement around one short side of the substantially rectangular portion 3 while the plate 5 can be considered to be arranged for movement around the other short side of portion 3. The plates 4 and 5 are also arranged to be coupled to each other so as to enable the plates to effect their rotary movements together. This coupling of the two plates is effected by means of slot-pin connections. The plate 4 is provided with a slot 7 and a pin 8. The pin 8 projects out on both sides of the plate and is intended to pass through a slot 9 in the plate 5. The plate 5 is provided with a pin 10 which passes through the slot 7 in the plate 4. The slot 7 and 9 are so positioned in relation to the pins 8 and 10 that the plates 4 and 5 rotate to the same extent and in the same direction.

The pins 8 and 10 are also arranged to pass through slots 11 in a further plate 12 which is mounted on a cylindrical portion 13 of the end of shaft 2 adjacent the substantially rectangular portion 3. The purpose of the further plate 12 is to hold the plates 4 and 5 resiliently in a rest position, which is shown in FIG. 2. To this end the further plate 12 is arranged to be activated by a spring 14 arranged in a slot in the cylindrical portion of shaft 2 and the ends of said spring projecting in between pins 15 on plate 12. A plurality of pins 15 are arranged to enable the tension of the spring 14 to be regulated.

Under normal conditions the component parts of the device occupy the rest position shown in FIG. 2, in which the plates 4 and 5 are held by means of the spring 14 through the further plate 12 and the pins 8 and 10, with one of the non-parallel sides of the hole 6 engaging one long side of the substantially rectangular portion 3. When the shaft 2 is subjected to angular acceleration in an anticlockwise direction, as seen in FIGS. 2 and 3 for example, as a result of a withdrawing force acting on the safety belt coiled on the shaft 2, the plates 4 and 5 are entrained with the movement of said shaft, via the spring 14, the further plate 12 and the pins 8 and 10. Upon an increase in said angular acceleration, the inertia of the plates 4 and 5 renders the force of spring 14 insufficient for the plates to be entrained with said angular rotation. The plates 4 and 5 thus rotate about the short sides of the rectangular portion 3 and are moved to the position shown in FIG. 3, and locking teeth 16 arranged on the peripheral surfaces of the plates are moved outwardly against a fixed tooth ring 17 having internal teeth, the tooth ring being securely mounted to the wall of the base member 1. If the angular acceleration exceeds a determined magnitude, which magnitude can be determined by selection of the size and inertia of the plates 4 and 5 and the strength of the spring 14, the locking teeth 16 are moved into engagement with the teeth of the tooth ring 17, thereby preventing rotation of the plates and thus also the shaft 2. Thus, the safety belt cannot be withdrawn and movement of the wearer in a forward direction is prevented. When the force acting on the safety belt which has given rise to the aforementioned angular acceleration ceases, the plates 4 and 5 are drawn by the spring 14 back to the rest position shown in FIG. 2 and the safety belt can be withdrawn from the spool.

The invention is not restricted to the described embodiment, but can be modified within the scope of the following claims.

What we claim is:

1. In a locking device for locking a rotatable shaft or the like against rotation in one direction and having locking means and detecting means for measuring the angular acceleration of said shaft and for moving said locking means into a locking position with respect to said shaft to prevent further rotation of said shaft in said one direction when said angular acceleration reaches a predetermined magnitude;
   a rotatable shaft having a portion of substantially rectangular cross sectional shape;
   detecting means mounted on said portion of said shaft, said detecting means comprising at least one plate;
   a substantially centrally disposed hole in said plate for receiving said portion of said shaft, said hole being substantially in the form of a trapezoid, said trapezoid having two substantially parallel sides of unequal length, the shorter one of said parallel sides being slightly longer than the shorter side of said rectangular portion of said shaft, the height of said trapezoid being slightly greater than the longer sides of said rectangular portion of said shaft;
   whereby said plate can be rotated around said shorter one of said parallel sides of said trapezoidally formed hole therein from a normal position in which one of the non-parallel sides of said hole abuts one of the longer sides of said rectangular portion of said shaft to an activated position in which the other non-parallel side of said hole abuts the other longer side of said rectangular position of said shaft, in which last mentioned position said locking means achieves a locking position.

2. The device of claim 1 further comprising: fixed abutment means for engagement by said locking means to prevent rotation of said shaft and to lock the same against further rotation in said one direction; and
   means to spring bias said plate toward said normal position, said one plate being rotated by inertia force around said shorter one of said parallel sides of said trapezoidally formed hole on said rectangular portion of said shaft against said spring-biasing means to a position in which said locking means is moved into engagement with said fixed abutment means when said angular acceleration reaches said predetermined magnitude.

3. The device of claim 2 in which said detecting means comprises a pair of plates arranged in side-by-side relationship, each of said plates having a journal point on an opposed shorter side of said rectangular portion of said shaft;
   each of said plates comprising a pin and a slot disposed so that the pin on one of said plates extends into the slot in the other of said plates, whereby said plates are coupled together for common movement.

4. The device of claim 2 further comprising a base member in which said shaft is journaled; said locking means comprising a plurality of teeth disposed on the periphery of said plate; said abutment means comprising a fixed tooth ring having a plurality of internally disposed teeth, said ring being mounted on said base member.

* * * * *

UNITED STATES PATENT OFFICE
CERTIFICATE OF CORRECTION

PATENT NO. : 3,929,300
DATED : December 30, 1975
INVENTOR(S) : Karl Lindqvist

It is certified that error appears in the above-identified patent and that said Letters Patent are hereby corrected as shown below:

Column 4, line 20, "position" should be --portion--.

Signed and Sealed this twenty-third Day of March 1976

[SEAL]

Attest:

RUTH C. MASON
*Attesting Officer*

C. MARSHALL DANN
*Commissioner of Patents and Trademarks*